United States Patent [19]

Bowers

[11] 4,015,290
[45] Mar. 29, 1977

[54] LOW POWER RECORDING INSTRUMENT WITH TWO OR MORE TRACKS

[75] Inventor: Jack R. Bowers, Petersburg, Ill.

[73] Assignee: Sangamo Electric Company, Springfield, Ill.

[22] Filed: July 31, 1975

[21] Appl. No.: 600,871

[52] U.S. Cl. .................................. 360/63; 360/68
[51] Int. Cl.² ...................... G11B 5/02; G11B 5/44
[58] Field of Search ............. 360/61, 63, 68, 6, 52, 360/46

[56] References Cited
UNITED STATES PATENTS

| | | | |
|---|---|---|---|
| 3,173,134 | 3/1965 | Petermann | 360/46 |
| 3,512,171 | 5/1970 | Hibner | 360/46 |
| 3,618,119 | 11/1971 | Rodriquez | 360/46 |
| 3,763,383 | 10/1973 | Johnson | 360/46 |

*Primary Examiner*—Vincent P. Canney
*Attorney, Agent, or Firm*—Johnson, Dienner, Emrich & Wagner

[57] ABSTRACT

A battery powered load survey recorder for measuring electrical loads and providing a magnetic tape record of data with time reference signals in a format which is compatible for use with available data processing apparatus includes a data recorder circuit serving as a signal source for a data head of the recorder for recording the data, and a time recorder circuit serving as a signal source for a time head of the recorder for recording the time signals, current flow over the two recording heads being effected in a series arrangement to provide NRZ1 recording with reduced current drain, and the direction of current flow in each head being controlled only by it associated signal source.

15 Claims, 5 Drawing Figures

LOW POWER RECORDING INSTRUMENT WITH TWO OR MORE TRACKS

BACKGROUND OF THE INVENTION

1. Field of the Invention

This invention relates to magnetic tape recording apparatus, and more particularly, to a battery operated load survey recorder for providing a magnetic tape recording of data relating to measurement data along with a time reference on separate tracks of a magnetic tape.

2. Description of the Prior Art

Load survey recorders are employed by the utility industry for automatically providing information relating to usage of a commodity, such as gas, water, or electricity, by a consumer. Typically, load survey recorders are used to provide a data record which is of assistance for the utility company in its evaluation of the load conditions for different types of customers, automatic billing, and the like.

One known load survey recorder for recording data relating to the load measured by a utility meter is disclosed in the U.S. Pat. No. 3,829,772 of N. F. Marsh, G. W. Morand and D. G. Sokol, entitled "LOAD SURVEY RECORDER FOR MEASURING ELECTRICAL PARAMETERS," which issued on Aug. 13, 1974. The survey recorder basically comprises a two-track cassette recorder including recorder circuitry which records data on a first track of the tape and timing pulses on a second track of the tape for identifying predetermined time intervals in which data recording occurs. Both data and time information are recorded in an NRZ1 (non-return to zero) format, with changes in polarity occuring on the data track being effected in response to the data pulses supplied to a first section of the recording circuitry, and changes in the polarity on the time track occuring in response to timing pulses supplied to a second section of the recording circuitry. The survey recorder employs a cassette tape cartridge which is changed at predetermined intervals, which in certain commercial applications is on the order of 30–35 days, and played back over tape processing equipment having a conventional playback head for the purpose of retrieving the recorded information.

While the survey recorder disclosed in the patent referenced above provides a magnetic recording of data with a time reference in a form which is compatible for use with available data processing equipment, the recorder requires 120 VAC power for energization. In some applications, 120 VAC is either not available or it is not desired. Accordingly, it would be desirable to have a battery operated load survey recorder which provides reliable recording of both data and a time reference on magnetic recording tape and which does not require commercial electrical power. It would also be desirable to have a battery operated load survey recorder which minimizes current drain on the battery such that the battery life is comparable with the cassette change interval.

SUMMARY OF THE INVENTION

It is an object of the present invention to provide a battery operated load survey recorder which provides reliable recording of data and which minimizes power requirements.

It is another object of the invention to provide a battery operated survey recorder employing a two-track cassette tape in which the recorder has minimal power requirements such that battery lifetime is comparable with the cassette change interval.

Another object of the invention is to provide a two track cassette recorder employing first and second recording heads where the current flow over the recording heads is effected in a series arrangement thereby minimizing the current requirements for the recorder.

It is another object of the invention to provide a survey recorder which produces recordings which are capable of being processed by available data processing equipment.

These and other objects are achieved by the present invention which has provided a battery operated load survey recorder including a data recorder means responsive to data input pulses to record a data track on a recording tape and a time recorder means responsive to timing pulses to provide a time track recording on the tape which identifies predetermined time intervals in which data recording occurs.

The data, which may relate to the load measured by a utility device, and the time reference, are recorded on the tape in a form which is a compatible for use with available data processing equipment.

The data recording means and the time recording means effect the energization of respective first and second record heads for recording data and time information on the tape as the tape is advanced past the first and second record heads.

In accordance with the invention, the data recorder means and the time recorder means include respective first and second switching means which connect the first and second record heads in a series energizing circuit between the battery terminals to permit a continuous DC current to flow over the first and second record heads, and means for controlling the first and second switching circuits to determine the direction of current flow in accordance with information to be recorded on the tape.

Both time and data recording is effected in an NRZ1 format and the same write current is supplied to both recording heads. Accordingly, current drain on the battery is minimized. Also, the recorder circuit employs integrated logic circuits for control purposes resulting in further minimization of power requirements for the recorder. Accordingly, total current drain on the battery is compatible with commercially available batteries and the battery life is comparable with the change interval for the recording tape.

DESCRIPTION OF A PREFERRED EMBODIMENT

Figure 1:
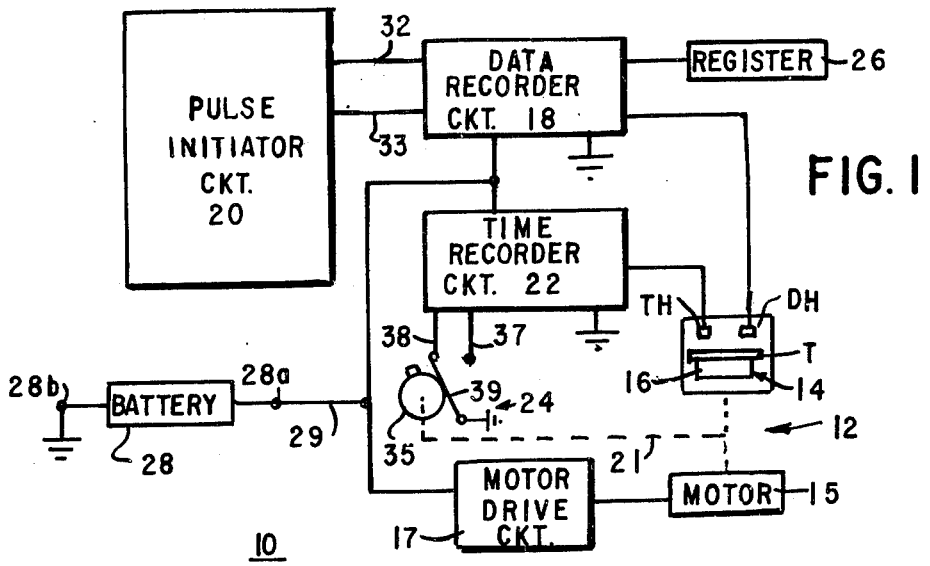
FIG. 1 is a block diagram of a battery powered load survey recorder provided by the present invention.

Referring to the drawings, FIG. 1 is a block diagram of the novel battery operated survey recorder 10 provided by the present invention. The survey recorder 10 is used in applications for providing a magnetic tape recording of measurement data as may be provided by a utility meter, which measures usage of a commodity such as gas, water, or electricity, or event data recording such as that related to the operation of traffic lights or the volume of traffic over a given street during different time intervals.

The survey recorder 10 comprises a two-track cassette tape recording unit 12 including a tape drive having a motor 15 and a tape transport apparatus 16 for advancing a magnetic tape T past a time head TH and a data head DH of the recording unit 12, and a motor drive circuit 17. The recorder 10 also includes a data recorder circuit 18 which is controlled by a pulse initiator circuit 20 to supply data signals representing a measurement, such as power usage measured by a utility meter, for example, to the data head DH for recording on the tape T, and a time recorder circuit 22 controlled by a timing circuit 24 to provide timing signals to the time head TH for recording on the tape T, which is stored in a cassette-type cartridge (not shown).

In accordance with the present invention, the survey recorder 10 is operated by a battery 28, shown having a positive terminal 28a connected to lead 29 and a negative terminal 28b connected to ground. In the exemplary embodiment, the battery 28 provides 12 volts d.c. and may comprise two type 520 batteries, commercially available from Union Carbide.

The motor drive circuit 17 provides drive signals of a predetermined frequency for the motor 15, which may be a stepping motor such as the Type WK2-300-1, which is commercially available from Electric Indicator Company of Wilton, Connecticut. The motor 15 is mechanically linked to the tape transport 16 over a gear train 21 to enable continuous advancement of the tape T past the time head TH and the data head DH of the recording unit 12.

The pulse initiator circuit 20 may comprise a simple single throw, double switch, used to indicate a measurement of a predetermined quantum, the switch being closed each time a measurement is to be indicated. Typical examples, include a gas meter, a water meter, a traffic survey installation, or the like, where AC power is not available, but a means, such as the torque of water passing through a water meter, or some other mechanical force indicative of a measurement is available to operate the switch.

For the purpose of the present description, it is sufficient to state that the pulse initiator circuit 20 is operable to supply a signal, such as ground, alternately to conductors 32 and 33, in accordance with measurements to be recorded. Conductors 32 and 33 are extended to the data recorder circuit 18.

The data recorder circuit 18 is controlled by the outputs of pulse initiator circuit 20 provided on conductors 32 and 33 to supply data signals to the data head DH for recording data impulses on one track of the magnetic tape T. The data information is recorded in an NRZ1 (non-return to zero) format. The data recorder circuit 18 provides direct current flow over the data record head DH and controls the direction of current flow over the record head DH, and therefore the polarity of the tape magnetization, as a function of the signal output of the pulse initiator circuit 20. That is, as the ground level is alternately switched from one of the conductors 32 (or 33) to the other conductor 33 (or 32), at the output of the pulse initiator circuit 20, the data recorder circuit 18 is operable to reverse the direction of current over data record head DH to thereby change the polarity of the magnetization.

A mechanical register 26, controlled by the data recorder circuit 18 may be used to provide a numerical readout of the number of data pulses recorded on the tape T.

The time recorder circuit 22 is controlled by the timing pulse generator 24 to effect the recording of timing pulses on a second track of the magnetic tape T to provide a time reference for the data pulses which are recorded on the other track of the tape T.

The timing circuit 24 includes a lobe cam 35 which is mechanically linked to the gear train 21 of the motor 15 which drives the tape drive 16 to advance the tape T past the time record head TH and the data record head DH of the recording unit 12. The cam 35 operates an associated microswitch 39 to provide a timing pulse at predetemined intervals, such as every 15 minutes, the timing pulse being supplied over conductors 37 and 38 to the time recorder circuit 22.

The time recorder circuit 22 supplies a continuous direct current flow to record head TH and reverses the direction of current flow over head TH, and therefore, the polarity of tape magnetization, in accordance with the pulses provided by the time pulse generator 24. Accordingly, as the tape T is advanced by the tape drive unit 14, data pulses indicative of a measurement are recorded on one track of the tape T and timing reference signals are recorded on a second track of the tape T.

DATA AND TIME RECORDER CIRCUITS

Figure 2:
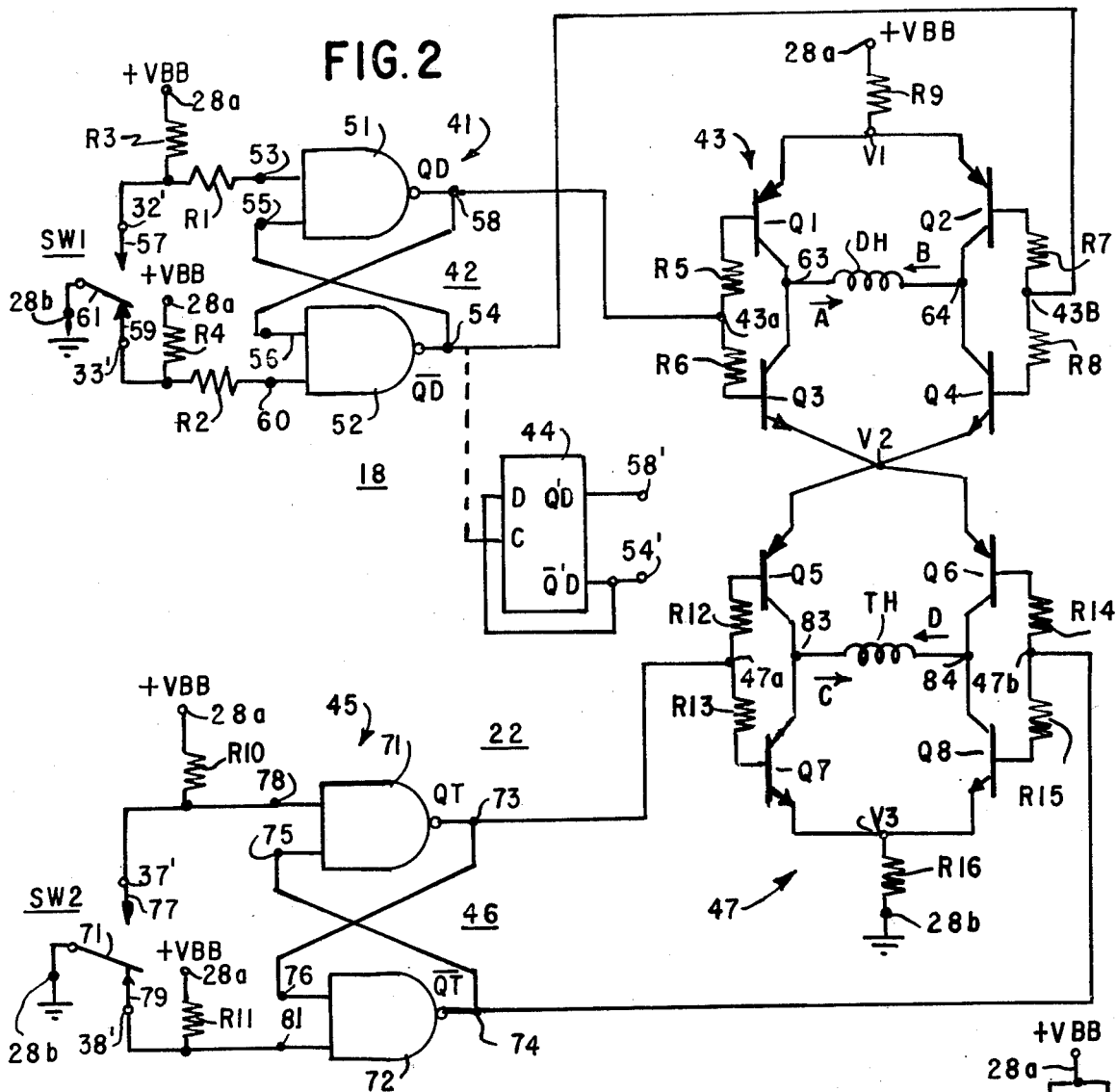
FIG. 2 is a schematic circuit diagram of data and time recorder circuits for the load survey recorder shown in FIG. 1.

Referring to FIG. 2, there is shown a schematic circuit diagram for the data recorder circuit 18 and the time recorder circuit 22. The data recorder circuit 18 comprises an input stage 41 including a latch circuit 42 which receives the data pulses provided by the pulse initiator circuit 20, represented symbolically by switch SW1, and an output switching circuit 43 which enables direct current to be continuously supplied to the data record head DH and which effects the reversal of the direction of current flow to the data head DH in response to the data pulses.

The time recorder circuit 22 is generally similar to the data recorder circuit 18 and includes an input stage 45 including a latch circuit 46 which receives the timing pulses provided by the time pulse generator 24, represented symbolically by switch SW2, and an output switching circuit 47 which enables direct current to be continuously supplied to the time record head TH and effects the reversal of the direction of current flow through the time head TH in response to the timing pulses.

Input signals for controlling the state of latch circuit 42 are provided by the pulse initiator circuit 20, represented by switch SW1, and input signals for controlling the state of latch circuit 46 are provided by the timing circuit 24, represented by switch SW2.

Referring to the data recorder circuit 18, the latch circuit 42 is shown to be comprised of a pair of NAND gates 51 and 52. The set input of latch circuit 42 at input 53 of gate 51 is connected over a resistor R1 to a terminal 32', which corresponds to one of the outputs 32 of the pulse initiator circuit 20, and over a resistor R3 to the positive battery terminal 28a. Terminal 32' is connected to a contact 57 of switch SW1 which has a switch arm 61 connected to ground (or the negative terminal 28b of battery 28). The reset input of the latch circuit 42 at input 60 of gate 52 is connected over a resistor R2 to a terminal 33' which corresponds to the other output 33 of the pulse initiator circuit 20, and over a resistor R4 to a positive battery terminal 28a.

The true output QD of the latch circuit 42 is provided at output 58 of gate 51 and the false output $\overline{QD}$ is provided at output 54 of gate 52. Output 58 of gate 51 is connected to a second input 56 of gate 52 and output 54 of gate 52 is connected to a second input 55 of gate 51.

The state of latch circuit 42 is controlled by switch SW1 such that the circuit 42 is reset whenever switch SW1 is operated to the position to engage contact 59 as shown in FIG. 2 such that a ground (logic 0) level is provided at output 58 and a +12 volt (logic 1 level) is provided at output 54 of gate 52.

The state of the latch circuit 42 controls the operation of the output switching stage 43 shown comprised of four switching transistors Q1–Q4 which are shown connected in a bridge network configuration between a pair of bias points V1 and V2 with each of the transistors Q1–Q4 forming a different leg of the bridge network. The data head DH forms a cross-over leg of the bridge network. Output 58 of the latch circuit 42 is connected over a resistor R5 to the base of transistor Q1 and over a resistor R6 to the base of transistor Q3. The output 54 of the latch circuit 42 is connected over a resistor R7 of the base of transistor Q2 and over a resistor R8 to the base of transistor Q4. The collectors of transistors Q1 and Q3 are connected together to one terminal 63 of the data head DH, and the collectors of transistors Q2 and Q4 are connected together and to the other terminal 64 of data head DH. The emitters of transistors Q1 and Q2 are commonly connected to bias point V1 which is connected over a resistor R9 to the positive battery terminal 28a, and the emitters of transistors Q3 and Q4 are commonly connected to bias point V2 which is connected to ground over the output switching circuit 47 of the time recorder circuit 22 as is described below.

The transistors Q1–Q4 are selectively enabled in pairs to provide two separate current paths over the data head DH. When the latch circuit 42 is in the reset state, ground level at output 58 causes transistor Q1 to be turned on and transistor Q3 to be cutoff, and the logic 1 level which is provided at output 54 causes transistor Q2 to be cut off and transistor Q4 to be turned on. Accordingly, a first current path is provided enabling current flow over data head DH in the direction of arrow A.

When the latch circuit 42 is set, transistors Q1 and Q4 are cut off and transistors Q2 and Q3 are turned on and a second current path is provided enabling current flow over a data head DH in the opposite direction as indicated by arrow B.

As indicated above, the state of latch circuit 42 is controlled by the input pulses provided by the pulse initiator circuit 20, and the latch circuit 42 is alternately set and reset, controlling the conductivity of transistors Q1–Q4 to reverse the polarity of the current flow through data head DH.

Digressing, in certain applications, the pulse initiator circuit 20 may provide one pulse per event while in other applications, two pulses per event. Accordingly, a pulse divider circuit 44 may be interposed between the outputs 58 and 54 of the latch circuit 42 and the inputs of the switching stage 43 to enable the pulse output of the pulse initiation circuit 20 to provide only one current reversal per event for the latter example. In the illustrated embodiment, the pulse divider circuit 44 is a data latch circuit which provides a divide by two function. The clock input of the data latch circuit 44 is connectable to one of the outputs 58 or 54 of latch circuit 42 and the outputs 58' and 54' of the data latch circuit are connectable to the inputs of switching circuit 43 at the junctions of resistors R5, R6, and R7, R8, respectively.

Referring now to the time recorder circuit 22, latch circuit 46 comprises a pair of NAND gates 71 and 72. The set input of latch circuit 46 at input 78 of gate 71 is connected to a terminal 37', which corresponds to one of the outputs 37 of the timing circuit 24 and over a resistor R10 to the positive battery terminal 28a. Terminal 37' is connected to a contact 77 of switch SW 2 which has a switch arm 71 connected to ground or the negative terminal 28b of the battery 28. Switch arm 71 is shown operated to a position to engage a second contact 79 of switch SW2. The reset input of latch circuit 46 at input 81 of gate 72 is connected to a terminal 38' which corresponds to the second output 38 of the timing circuit 24 and over a resistor R11 to the positive battery terminal 28a.

The true output QT of latch circuit 46 is provided at an output 73 of gate 71 which is connected to a second input of 76 of gate 72. The false output $\overline{QT}$ of the latch circuit 46 is provided at output 74 of gate 72, which is connected to a second input 75 of gate 71.

The state of latch circuit 46 is controlled by switch SW2 such that latch circuit 46 is reset whenever switch arm 71 is operated to engage contact 79 to provide a ground level at output 73 of latch circuit 46 and a logic 1 level at output 74. Latch circuit 46 is set whenever switch arm 71 is operated to engage contact 77 to extend a ground level to input 78 of the latch circuit 46 enabling a logic 1 level to be provided at output 73 and a logic 0 level to be provided at output 74.

The state of latch circuit 46 controls the operation of the output switching stage 47 which includes four switching transistors Q5–Q8 which are connected in a bridge network in a manner similar to transistors Q1–Q4 of output switching stage 43 of the data recorder circuit 18.

The switching transistors Q5–Q8 are connected in a bridge configuration between a pair of bias points V2 and V3, with the transistors Q5 and Q8 forming four legs of a bridge network and the time head TH forming a cross-over leg of the bridge network. Output 73 of latch circuit 46 is connected over resistor R12 to the base of transistor Q5 and over a resistor R13 to the base of transistor Q7. The output 74 of latch circuit 46 is connected over a resistor R14 to the base of transistor Q6 and over a resistor R15 to the base of transistor Q8. The collectors of transistors Q5 and Q7 are connected together and to one terminal 83 of time head TH, and the collectors of transistors Q6 and Q8 are commonly connected to the other terminal 84 of time head TH. The emitters of transistors Q5 and Q6 are connected to bias point V2 and the emitters of transistors Q7 and Q8 are connected together at bias point V3 which in turn is connected over a resistor R16 to ground or the negative terminal 28b of the battery 28.

According to the invention, the same write current flows through both recording heads DH and TH with the direction of current flow in each head being determined independently by its associated signal source, that is latch circuits 42 and 46. In other words, the recording heads DH and TH are effectively connected in series between bias points V1 and V3, and the switching circuits 43 and 47 selectively connect each head so that current flow through the head is in a direction which depends only upon its own signal source. It is pointed out this novel concept is not limited to use with two track recording and that any number of recording heads could be connected in series in this manner so that they all have the same value of write current while permitting selective control of the direction of current flow independently by separate signal source for each head. Nor is the novel series arrangement for the record heads limited to applications in battery operated recorders. Such arrangement may also be employed in a data recorder which is energized by conventional 120 VAC power.

OPERATION OF THE RECORDER CIRCUITS

The pulse initiator circuit 20, represented by switch SW1 in FIG. 2, alternately applies a ground potential to contacts 57 and 59 over switch arm 61 for each measurement to be recorded. Assuming that switch arm 61 of switch SW1 is operated to the position shown in FIG. 2, then the latch circuit 42 is reset such that transistors Q1 and Q4 are conducting and transistors Q2 and Q3 are cut off. Accordingly, DC current flows from the positive battery terminal 28a to bias point V1, through transistor Q1 and the data head DH in the direction of arrow A, assumed to be negative, and over transistor Q4 to bias point V2, thence over transistor Q5 (or Q6), the time head TH, and transistor Q8 (or Q7) to bias point V3, and thence to ground, or the negative battery terminal 28b.

Figure 3:
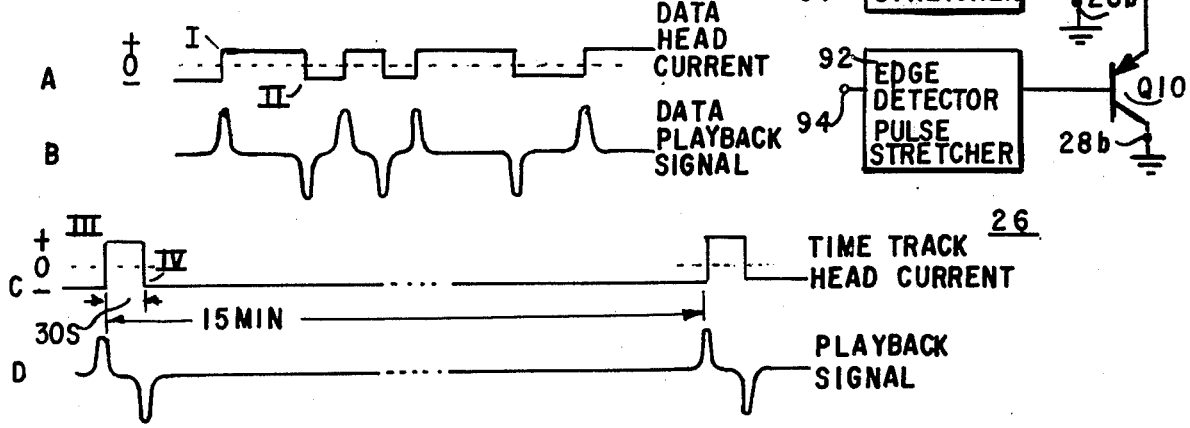
FIG. 3 is a timing diagram showing wave forms of signals for the data and time recorder circuits of FIG. 2 and playback waveforms for signals recorded on data and time tracks of a magnetic tape.

When switch SW1 arm 61 operates to remove ground from contact 59 and to ground contact 57, enabling a positive potential to be extended to reset input 60 of latch circuit 42 over resistors R4 and R2, and grounding the set input 53 of the latch circuit 42 over resistor R1, the latch circuit 42 is set. Accordingly, a logic 1 level is provided at output 58 and a logic 0 level is provided at output 54, such that transistors Q1 and Q4 are cut off and transistors Q2 and Q3 are turned on, reversing the direction of current flow over data head DH, as indicated at I in line A of FIG. 3, and providing a positive pulse (FIG. 3, Line B), which is recorded on a first track of the tape T.

When switch arm 61 of switch SW1 is operated to again engage contact 59, connecting ground to contact 59 and to the reset input 60 of the latch circuit 42 and removing ground from contact 57, a positive potential is extended over resistors R3 and R1 to the set input 53 of latch circuit 42, resetting the latch circuit 42. Accordingly, transistors Q2 and Q3 are cut off, and transistors Q1 and Q4 are turned on, reversing the direction of current flow over the data head DH, as indicated at II in line A of FIG. 3, providing a negative going pulse (FIG. 3, line B) which is recorded on the tape T. When the divide by two circuit 44 is employed, the current flow reversal is effected only once for each operation of the switch SW1.

As the tape T is continuously advanced past the data head DH by the tape drive apparatus 12, a series of pulses related to the measurement is recorded on the tape T.

The operation of the time recorder circuit 22 is similar. Referring to FIG. 1, each time the motor 15 drives the cam 35 to the camming position, a new fifteen minute timing interval is initiated, and switch 39 is operated to connect ground to output 37 and to remove ground from output 38 for a period of approximately 30 seconds, thereby providing a timing pulse to the time recorder circuit 22.

Referring to FIG. 2, switch arm 71 is shown operated to normally connect ground to the reset input of 81 of latch circuit 46 which is thus normally reset to provide a logic 0 level at output 73 in a logic 1 level at output at 74, causing transistors Q5 and Q8 to be conducting and transistors Q6 and Q7 to be non-conducting. Accordingly, current flow through the timing head TH is normally in the direction shown by arrow C, assumed to be negative.

At the start of each timing period, switch SW2 is operated to remove ground from contact 79 and the reset input 81 of latch circuit 46, and to connect ground to contact 77 and the set input 78 of latch circuit 46 causing the latch circuit 46 to be set. Accordingly, transistors Q5 and Q8 are cut off, and transistors Q6 and Q7 are turned on, reversing the direction of current flow through the time head TH as indicated at III, FIG. 3 line C. The reversal of current enables a positive pulse to be recorded on a second track of tape T. After the 30 second interval during which switch arm 71 engages contact 77, cam 35 enables switch arm 71 to engage contact 79, connecting ground to the reset input 81 of the latch circuit 46, resetting the latch circuit 46, rendering transistors Q5 and Q8 conductive, and cutting off transistors Q6 and Q7, thereby reversing the direction of current flow through the time head TH as shown at IV, line C of FIG. 3, to provide a negative pulse which is recorded on the tape T.

Such operation continues until such time as the cassette tape supply is exhausted, which, in typical commercial applications is approximately 30–35 days. At such time, the cassette tape is removed from the recorder and played back over tape processing equipment to retrieve the recorded information.

It is pointed out that when a transition occurs for the data head DH (or time head TH), current is still available for the time head TH (or data head DH). Assuming transistors Q1 and Q4 are on and that transistors Q2 and Q3 are off and that a transition is about to occur, as the current through transistors Q1 and Q4 decreases, the current through transistors Q2 and Q3 is increasing. The condition of zero current through the data head DH occurs when the current through transistors Q1 and Q4 is equal to the current through transistors Q2 and Q3. However, current is still available for the time head TH. Should a circuit unbalance due to component variations cause delays on the order of 0.1 to 0.5 microseconds, the recorder is not capable of recording the 5 or 10 Mega Hertz signal represented by such unbalance condition.

Thus, the output switching circuits 43 and 47 enable continuous direct current flow from the positive terminal 28a of the battery 28 through transistor switching circuit 43, data recording head DH, through switching circuit 47 and the time head TH to the negative terminal 28b of the battery 28. The direction of current flow through each recording head is determined only by its input signal source, and the direction of current flow in each head may be changed without any effect on the direction of current flow in the other, even though the same current flows through both the data head DH and the time head TH. In the exemplary embodiment which employs a 12 volt battery supply 28, the head current is on the order of 4.6 ma, which is low enough to make NRZ recording practical in a battery operated recorder.

Figure 4:
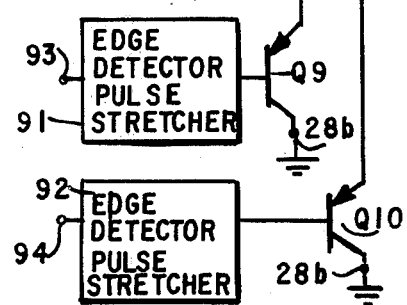
FIG. 4 is schematic representation of a register circuit which may be employed in the survey recorder; and, FIG. 5 is a schematic circuit diagram of a motor drive circuit for the load survey recorder shown in FIG. 1.

Referring to FIG. 4, the register 26, which may be provided optionally, includes a mechanical display counter (not shown) driven by a stepping motor having a pair of windings 95 and 96 which are individually connectable between the positive battery terminal 28a and ground or the negative battery terminal 28b over normally non-conducting switching transistors Q9 and Q10, respectively. The conductivity of the transistors Q9 and Q10 is controlled by a pair of edge detector and pulse stretching circuits 91 and 92, which may be the type shown in RCA Application Note ICAN6267. Circuits 91 and 92 have inputs 93 and 94 connectable to respective outputs 58 and 54 of latch circuit 42.

In operation, edge detector circuit 91 is enabled in response to each negative going transistion at output 58 of latch circuit 42 to enable transistor Q9 for a predetermined time for energizing winding 95 to increment the mechanical counter. Similarly, edge detector 92 is enabled in response to each negative going transition at output 54 of latch circuit 42 to enable transistor Q10 for a predetermined time for energizing winding 96 to increment the mechanical counter. The register 26 provides a numericl display related to the measurement.

MOTOR DRIVE CIRCUIT

Figure 5:
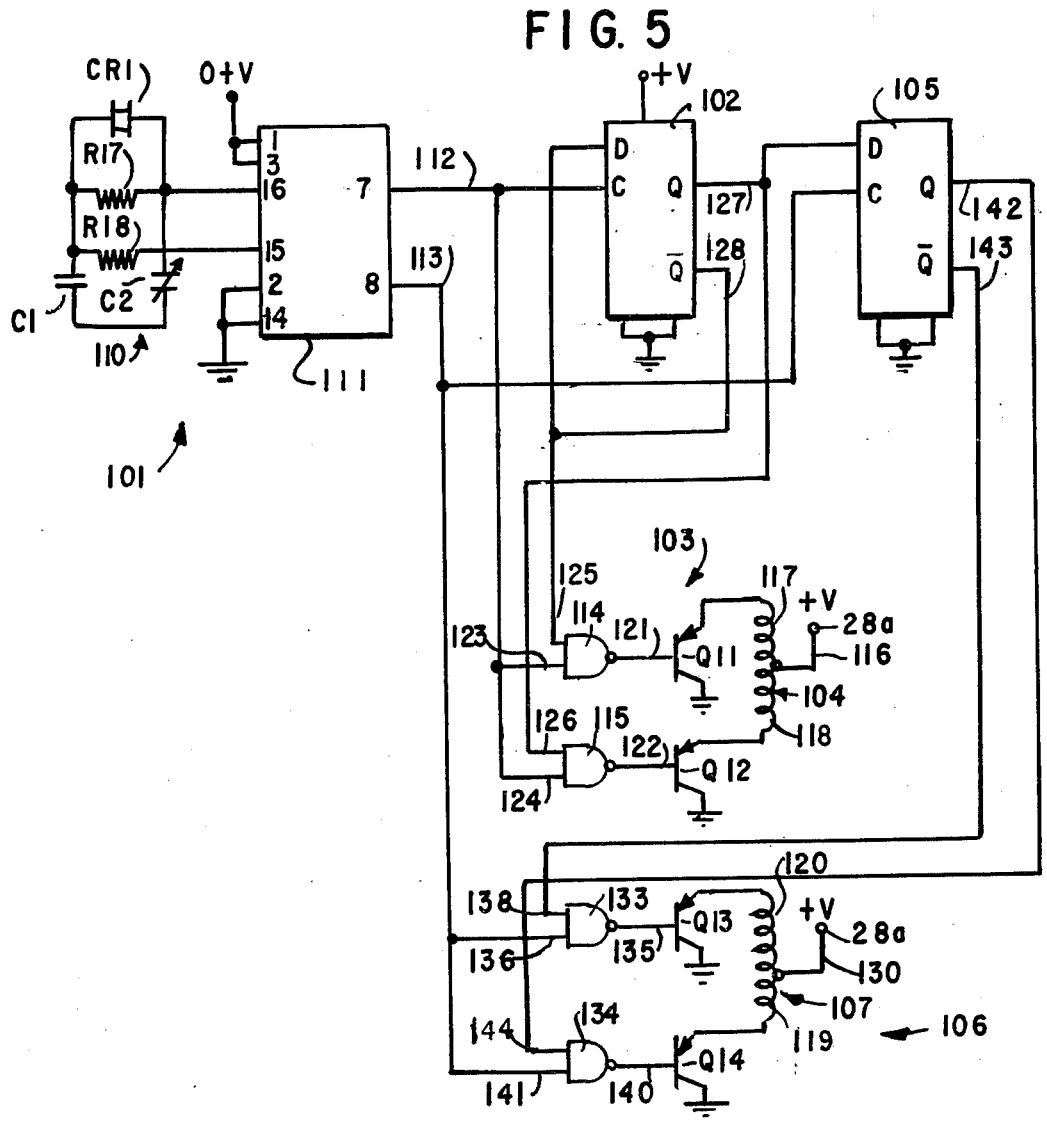

Referring to FIG. 5, there is shown a schematic circuit diagram for the motor drive circuit 17 which supplies drive pulses to the stepping motor 15 at a frequency which is sufficient to enable continuous advancement of the tape T past the time and data heads at a given rate, typically 0.001 ips. The motor drive circuit 17 basically comprises a pulse generating circuit 101, a first control circuit 102 and a first drive circuit 103 which control the energization of a first winding 104 of the stepping motor 15, and a second control circuit 105 and a second drive circuit 106 which control the energization of a second winding 107 of the stepping motor 15, which is a permanent magnet type. The windings 104 and 107 are center tapped to permit four phase excitation, with the winding portions being energized in sequence to effect rotation of the motor shaft.

The clock pulse generating circuit 101 includes a crystal oscillator 110 and a N-stage counter 111, which may be the Type SCL4445A, commercially available from Solid State Scientific Inc., of Montgomeryville, Pa. The crystal oscillator 110 comprises a crystal CR1, the natural frequency of which may, for example, be 4.6603 MHZ and frequency determining components including resistors R17 and R18 and capacitors C1 and C2 which are connected between pins 15 and 16 of the counter 111 to provide a signal at the frequency 4.6603 MHZ. The counter 111 counts down the frequency output of the oscillator 110 and provides a 14 MS pulse with a period of 900 MS at an output 112, pin 7 of the commercial device, and a further 14MS pulse of the same period, but delayed by 450 MS, at an output 113, pin 8 of the device. The precise frequency established by the crystal oscillator 110 controls th speed of the stepping motor 15.

Control circuit 102 is embodied as a date latch circuit having a clock input connected to the output 112 of the counter circuit 111, a true output Q at 127, a false output $\bar{Q}$ at 128 and a data input connected to the output 128. The data latch circuit is controlled by the 14 MS pulse output of the counter 111 to alternately store logic 1 and logic 0 levels to provide enabling signals for the drive circuit 103 for energizing the winding 104 of the stepping motor 15.

Drive circuit 103 includes a pair of drive transistors Q11 and Q12 and a pair of NAND gates 114 and 115 which effect enabling of transistors Q11 and Q12, respectively. The motor winding 104 is connected between the emitters of transistors Q11 ans Q12 which have their collectors connected to ground. A center tap 116 of the winding 104 is connected to the positive battery terminal 28a, segmenting the winding 104 into two winding portions 117 and 118, which are individually connectable to ground over respective transistors Q11 and Q12 whenever transistor Q11 or Q12 is conducting.

The conductivity of transistors Q11 and Q12 is selectively controlled by gates 114 and 115, respectively, which have respective outputs 121 and 122 connected to the bases of transistors Q11 and Q12, first inputs 123 and 124 commonly connected to the ouput 112 of the counter circuit 111 and second inputs 125 and 126, respectively, connected to outputs 128 and 127 of the data latch circuit 102.

Control circuit 105 is embodied as a further data latch circuit having a data input connected to output 127 of latch circuit 102, a clock input connected to the other output 113 of the counter circuit 111, and a true output Q at 142 and a false output $\bar{Q}$ at 143. Data latch circuit 105 is controlled by the 14 MS pulse output at 113 of the counter 111 and the output at 127 of latch 102 to alternately store logic 1 and logic 0 levels to provide enabling signals for drive circuits 106. Drive circuit 106, which controls the energizing of winding 107 of the stepping motor 15, comprises a pair of switching transistors Q13 and Q14 and associated NAND gate circuits 133 and 134. Winding 107 of the stepping motor 15 is connected between the emitters of transistors Q13 and Q14 and has a center tap 130 connected to the positive battery terminal 28a defining winding portions 119 and 120. The collectors of transistors Q13 and Q14 are connected to ground. The base of transistor Q13 is connected to the output 135 of gate 133 which has a first input 136 connected to output 113 of the counter circuit 111 and a second input 138 connected to output 143 of latch circuit 105.

Similarly, transistor Q14 has its base connected to the output 140 of gate 134 which has a first input 141 connected to the output 113 of the counter 111 and a second input 144 connected to output 142 of latch circuit 105

OPERATION OF THE MOTOR DRIVE CIRCUIT

The crystal oscillator 110 is continuously operable to generate a signal at a frequency of 4.6603 MHZ which is extended to the counter circuit 111 at input pin 16 which counts down the 4.6603 MHZ signal and provides a 14 MS pulse at a 900 MS period at output 112 and the delayed 14 MS pulse of the same period at output 113.

Assuming data latch circuits 102 and 102 each store logic 0 bits such that outputs 127 and 142 are at logic 0 levels and outputs 128 and 143 are at logic 1 levels, and that switching transistors Q11–Q14 are non-conducting, then when the next 14 MS pulse is provided at the output 112 of counter 111, the logic 1 level at output 128 of latch circuit 102 is gated into the latch circuit 102 in response to the leading edge of the 14 MS pulse, providing a logic 1 level output at 127 which is extended to input 126 of gate 115 which is thus enabled by the 14 MS pulse provided at output 112 to provide an enabling signal for switching transistor Q12, energizing winding 118 of the motor winding 104 to rotate the motor shaft a given increment.

At the end of the 14 MS pulse, gate 115 is disabled rendering transistor Q12 non-conductive and deenergizing winding 118. The latch circuit 105 then responds to the next pulse provided at output 113 of the counter 111 after the 450 MS delay, to load the logic 1 level signal provided at output 127 of latch 102 into the latch circuit 105 so that a logic 1 level is provided at output 142. The logic 1 level is extended to input 144 of gate 134 permitting gate 134 to be enabled by the pulse provided at output 113 to render transistor Q14 conductive, energizing winding portion 119 to step the motor shaft.

When the next 14 MS pulse is provided at output 112, gate 134 is disabled rendering transistor Q14 non-conductive, deenergizing winding portion 119. Such pulse also enables the logic 0 level provided at output 128 to be loaded into the data latch circuit 102 which then provides a logic 0 level at output 127 and a logic 1 level at output 128 which enables gate 114 to render transistor Q4 conductive energizing winding portion 117 of motor winding 104.

At the end of the 14 MS pulse, gate 114 is disabled, causing transistor Q11 to be cut off such that winding portion 117 is deenergized.

When next 14 MS pulse is provided at output 113 of the counter 111, latch circuit 105 responds to the signal on output 113 to load the logic 0 level signal provided at output 127 of latch circuit 102 providing a logic 1 level at output 143 enabling gate 133 to render transistor Q13 conductive to energize winding portion 120.

The cycle then repeats as the pulse generating circuit 101 provides 14 MS pulses to the control circuits 102 and 105 for energizing windings 104 and 107 to rotate the motor shaft effecting continuous movement of the tape T and continuous rotation of the timing cam 35.

In one embodiment, the components of the survey recorder circuit have the following values:

| | |
|---|---|
| R1, R2 | 100K ohms |
| R3, R4, R10, R11 | 4.7K ohms |
| R5–R8, R12–R15 | 39K ohms |
| R9, R16 | 1.2K ohms |
| R17 | 10M ohms |
| R18 | 2K ohms |
| C1 | 120 pfd |
| C2 | -5-30 pfd |
| Q1, Q2, Q5, Q6, Q9–Q14 | 2N4126 |
| Q3, Q4, Q7, Q8 | 2N4124 |
| NAND gates 51, 54, 71, 72, 114, 115, 133, 134 | CD4011 |
| Data Latch Circuits 44, 102, 105 | CD4013 |

The above component values and devices are provided by way of illustration of one embodiment for the survey recorder circuit and are not intended as a limitation of the scope of the invention.

I claim:

1. In a recording device including a plurality of recording heads for data recording purposes, a recorder circuit for controlling the energization of said recording heads comprising a plurality of switching circuits, each of which has an input terminal and an output terminal and each of which includes switching means operable to a first state to connect an associated one of said recording heads to its input and output terminals to provide current flow over said recording head in a first direction and operable to a second state to connect the associated recording head to its input and output terminals to provide current flow over said head in a second direction, said plurality of switching circuits being connected in series to enable the switching means for said plurality of switching circuits to provide a series circuit path including said plurality of recording heads between a first terminal of one of said switching circuits and a second terminal of another one of said switching circuits, and means for connecting said first and second terminals to respective first and second outputs of a current source to provide current flow over each of said heads in said series circuit path with the direction of current flow over each head being determined by the state of the switching means for such head.

2. In a recording device including at least first and second recording heads for data recording purposes, a recorder circuit for controlling the energization of said recording heads comprising first switching means operable alternately to first and second switching states to respectively provide a current path over said first recording head in a first and a second direction, second switching means operable alternately to first and second switching states to respectively provide a current path over said second recording head in a first and a second direction, and control means for controlling said first and second switching means to connect said first and second recording heads in a series energizing circuit for each state of said first and second switching means, permitting the same current to flow over said recording heads, with the direction of current flow in each recording head being determined independently by the switching state of the associated switching means.

3. In a recording device including at least first and second recording heads for data recording purposes, a recorder circuit for controlling the energization of said recording heads comprising first switching means operable alternately to first and second switching states to respectively provide a current path over said first recording head in a first and a second direction, second switching means operable alternately to first and second switching states to respectively provide a current path over said second recording head in a first and a second direction, and control means for controlling said first and second switching means to provide a series energizing circuit for said first and second recording heads for each state of said first and second switching means, said control means including a first control circuit associated with said first switching means for alternately providing a first and a second pair of control signals to control inputs of said first switching means for operating said first switching means to said first and second switching states, respectively, to determine the direction of current flow through said first recording head, and a second control circuit associated with said second switching means for alternately providing a first and a second pair of control signals to control inputs of said second switching means for operating said second switching means to said first and second switching states, respectively, to determine the direction of current flow through said second recording head.

4. A recording device as set forth in claim 3 wherein said first and second control circuits include respective first and second bistable circuits which are independently operable to first and second states to provide said first and second pairs of control signals at outputs thereof, said first and second switching means being operated to one of said switching states in accordance with the state of the associated bistable circuit to thereby maintain continuous current flow through said recording heads.

5. A recording device as set forth in claim 4 wherein said series energizing circuit includes a battery for supplying a continuous DC current to said recording heads over said first and second switching means.

6. In a battery operated recording device for survey purposes having at least first and second magnetic recording heads for applying magnetic marks to a recording medium, a first signal input means, first switching means connecting said first recording head between a first bias point and an intermediate point to achieve current flow over said first recording head in a direction determined by the signals input over said first signal input means, a second signal input means, second switching means connecting said second recording head between said intermediate point and a second bias point to achieve current flow over said second recording head in a direction determined by the signals input over said second signal input means, and means for connecting said first and the second bias points to respective first and second outputs of a source of current, said first and second recording heads being effectively connected in series between said first and second bias points by said first and second switching means, permitting continuous current flow through said first and second switching means and said first and second recording heads with the direction of current flow in each recording head being determined independently by its associated signal input means.

7. In a battery operated recording device for survey purposes having at least first and second magnetic recording heads for applying magnetic marks to a recording medium, a first signal input means, first switching means connecting said first recording head between a first bias point and an intermediate point to achieve current flow over said first recording head in a direction determined by the signals input over said first signal input means, a second signal input means, second switching means connecting said second recording head between said intermediate point and a second bias point to achieve current flow over said second recording head in a direction determined by the signals input over said second signal input means, and means for supplying current between said first and second bias points through said switching means and said recording heads, said first and said second switching means each comprising a bridge network having four switching devices forming the legs of said bridge network, the corresponding recording head being connected in one diagonal of the bridge network, and the other diagonal of the bridge network being connected between the corresponding bias point and the intermediate point, said signal input means for each switching circuit being connected to the four switching devices of each switching means and being operable to enable two of the switching devices in opposite legs of the associated bridge network and to disable the other two switching devices as a function of the signals received over said signal input means, whereby said recording heads are effectively connected in series between said first and second bias points with the direction of current flow in each recording head being determined independently by its associated signal input means.

8. A recording device as set forth in claim 7 wherein each of said switching devices comprises a transistor.

9. In a recording device having at least first and second recording heads, a recorder circuit for controlling the energization of said recording heads to record measurement data and time reference information on a magnetic tape, said recorder circuit comprising first switching means operable alternately to first and second states to respectively provide a current path over said first recording head in a first and a second direction, second switching means operable alternately to first and second states to respectively provide a current path over said second recording head in a first and a second direction, and control means for controlling said first and second switching means to provide a series energizing path for said first and second switching means to enable continuous current flow over said recording heads, said control means including data signal input means for controlling said first switching means to effect alternate reversals in the direction of current flow over said first recording head independently of the current flow over said second recording head for recording data pulses on said magnetic tape, and timing signal input means for controlling said second switching means to effect alternate reversals in the direction of current flow over said second recording head independently of the current flow over said first recording head for recording time reference pulses on said magnetic tape as a reference for said data pulses.

10. A recording device as set forth in claim 9 wherein said first switching means comprises first and second pairs of switching devices individually operable to connect said first recording head between first and second bias points to enable current flow over said first recording head in said first and second directions, respectively, and wherein said second switching means comprises third and fourth pairs of switching devices individually operable to connect said second recording head between said second bias point and a third bias point to enable current flow over said second recording head in said first and second directions respectively.

11. A recording device as set forth in claim 10 wherein said data signal input means includes pulse initiating means operable to provide a series of data pulses indicative of a measurement and latch circuit means responsive to successive data pulses of said series to provide control signals for alternately enabling said first and second pairs of switching devices.

12. A recording device as set forth in claim 10 wherein said timing signal input means includes timing pulse generating means for providing timing pulses at predetermined intervals and latch circuit means responsive to said timing pulses to provide control signals for alternately enabling said third and fourth pairs of switching devices.

13. A recording device as set forth in claim 11 which includes register means controlled by said latch circuit means to register the number of data pulses provided by said pulse initiating means.

14. A recording device as set forth in claim 10 wherein said recorder circuit includes a battery for supplying power to said recorder circuit.

15. A recording device as set forth in claim 14 which includes tape transport apparatus including a stepping motor for advancing said magnetic tape past said first and second recording heads and motor drive means energized by said battery for supplying drive pulses to operate windings of said stepping motor.

* * * * *